F. L. FOLWELL.
SELF ADJUSTING DEVICE FOR HOLDING AND TENSIONING ANTISKID CHAINS.
APPLICATION FILED MAR. 25, 1919.
1,338,646. Patented Apr. 27, 1920.
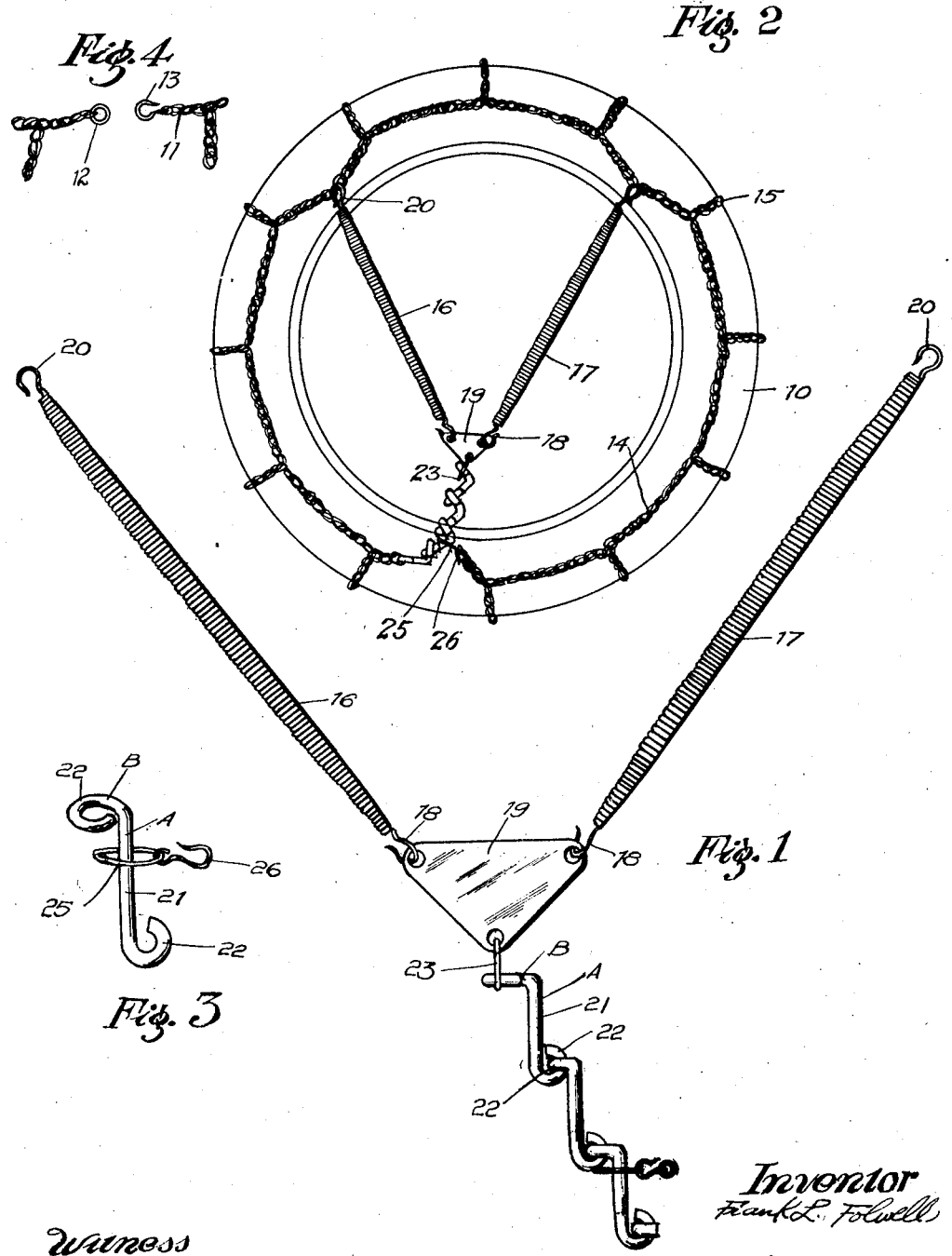

UNITED STATES PATENT OFFICE.

FRANK L. FOLWELL, OF DES MOINES, IOWA.

SELF-ADJUSTING DEVICE FOR HOLDING AND TENSIONING ANTISKID-CHAINS.

1,338,646.　　　　Specification of Letters Patent.　　Patented Apr. 27, 1920.

Application filed March 25, 1919. Serial No. 285,024.

*To all whom it may concern:*

Be it known that I, FRANK L. FOLWELL, a citizen of the United States, and a resident of Des Moines, in the county of Polk and State of Iowa, have invented a certain new and useful Self-Adjusting Device for Holding and Tensioning Antiskid-Chains, of which the following is a specification.

The object of my invention is to provide a self-adjusting device of simple, durable and inexpensive construction for holding and tensioning anti-skid chains.

More particularly it is my object to provide in combination with anti-skid chains of the general type having an annular member of smaller diameter than the tire on which the chain is used, and having a plurality of spaced cross chains, a holding and automatic tensioning device, comprising springs connected with each other and designed to be connected with said annular member or the like, said springs being connected with a link device so constructed and arranged that it may be secured to one end of said annular member, a ring being slidably mounted on said link device and connected with the other end of the annular member for holding said ends in different relative positions with relation to each other, depending upon the tension of said springs.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a plan view of my improved holding and automatic tensioning device.

Fig. 2 shows a side elevation of a tire equipped with a chain, and with my improved holding and automatically tensioning device.

Fig. 3 shows a detail view of one of the members of the link device; and

Fig. 4 shows a detail view of the ends of one of the annular members of the anti-skid chain device.

In the accompanying drawings I have used the reference numeral 10 to indicate generally a tire on which is mounted an anti-skid chain comprising an annular chain or the like 11, of smaller diameter than the tire, having at one end a ring 12 and at the other end a hook 13, whereby the ends of said chain device may be secured together.

On the opposite side of the tire is a similar annular chain device 14. The chain devices 14 and 11 are connected by circumferentially spaced cross chains 15.

My improved holding and self-adjusting tensioning device comprises a pair of coil springs 16 and 17, which when installed in position for use, are secured by means of hooks 18 to a plate or the like 19, and then extend away from said plate and away from each other, as illustrated in Figs. 1 and 2.

On the opposite ends of the springs 16 and 17 are hooks 20. Pivotally connected with the plate 19 and thus with the chains 16 and 17 is a link device, comprising links 21 having portions A and B arranged substantially at right-angles to each other and having at their ends loops or the like 22.

One of the links is connected with the plate 19 by means of a ring 23 and the links are successively connected together by linking one loop 22 of one link through the adjacent loop 22 of the next link.

The link farthest from the plate 19 is secured to one end of the chain device 14, as illustrated in Fig. 2.

Loosely mounted on the link device is a ring 25 large enough to readily slide over the joints between the links, and secured to the ring 25 is a hook 26.

In installing my device on a tire, the chain 11 is placed in position on the inside of the wheel and the ends are fastened together by means of the hook 13 and ring 12. The cross chains are then extended across the tire as illustrated in Fig. 2. The hook 26 is fastened to the free end of the chain 14, and the hooks 20 are fastened to the chain 14 at points spaced substantially from each other.

It will be understood that in putting the device on a tire, the chains 16 and 17 are tensioned considerably.

When the device is first installed on the car, the ring 25 will ordinarily be on the link 21 adjacent to the plate 19.

As the wheel on which the tire is mounted travels, the cross chains, adjacent to the ends of the chain device 14 to which the link device and the hook 26 are secured, will for a short time in each revolution be held between the tire and the ground and the slack in the non-skid chain 14 will permit the ring 25 to drop downwardly over the joints between the links of the link device toward the outer end of said device, and this operation will continue until the ring 25 is on the proper link for maintaining the springs at the proper tension.

I have had my device in use for some time and find that the ring 25 will automatically take its place on one of the intermediate links where the proper tension of the springs will be maintained.

A device of this kind has a number of substantial advantages. The use of the tensioning springs holds the non-skid chains against too much play on the wheel, prevents the chain from striking the parts of the machine or catching thereon; and very largely prevents any spinning of the wheels in the chains.

On account of the arrangement of the links with portions at right-angles to each other, I have found that after the ring 25 drops to position on the proper link, it will remain in the angle thereof and will not change its position until the chains are removed.

In further explanation of the installation and operation of my device, it may be said that the ends of the annular chain or the like 11 are connected together on the inside of the wheel and the cross chains are approximately in their proper position. The ends of the springs 16 and 17 are connected with the chain 14 at points spaced from each other, as illustrated in Fig. 2.

The link device is inserted through the ring 25, and the ring is drawn up to position close to the member 19. The chains are then pulled to stretched position and the hook 26 is caused to engage the other end of the chain 14.

The end of the chain 14 to which the hook 26 is secured will be held tight under tension, while the opposite end of the chain 14 will be somewhat loosely held. As the wheel rotates the ring 26 will gradually work outwardly on the link device until the tension of the springs 16 and 17 is evenly distributed around the anti-skid chains.

When the ring 26 reaches this last described position on the link device it will remain there and will be held in the angle of one of the links.

Some modifications in structure may be made in my improved device without departing from the essential spirit and purpose of my invention, and it is my intention to cover by my claims any modified forms of structure or use of mechanical equivalents, which may reasonably be included within the scope of my claims.

I claim as my invention:

1. In a device of the class described, a pair of coil springs, a link device operatively connected with one end of each spring, said link device comprising a series of links pivotally connected together, each having portions arranged at substantial angles with relation to each other, and a ring mounted on said link device and capable of sliding over the joints between the links.

2. In a device of the class described, the combination of a non-skid chain device comprising a pair of annular members of smaller diameter than the tire on which the device is to be used, one of said members having means for securing its ends together, and cross chains for connecting said annular members, with a holding and tensioning device comprising a pair of coil springs, a link device secured at different points between the ends of one of said annular members connected with one end of each spring, said link device comprising a series of links each having portions arranged at substantial angles with relation to each other, one end of said link device being secured to one end of said last named annular member, a fastening device adapted to move freely on said link device and to be secured to the other end of said last named annular member.

Des Moines, Iowa, February 26, 1919.

FRANK L. FOLWELL.